US007947119B2

(12) United States Patent
Gölz et al.

(10) Patent No.: US 7,947,119 B2
(45) Date of Patent: May 24, 2011

(54) HYDROGEN RESERVOIR AND PROCESS FOR FILLING A HYDROGEN RESERVOIR

(75) Inventors: Daniel Gölz, Munich (DE); Claude Keller, Munich (DE); Wolfgang Polifke, Freising (DE); Eberhard Schmidt-Ihn, Esslingen (DE); David Wenger, Ulm (DE)

(73) Assignee: Daimler, AG, Stuttgart (DE)

( * ) Notice: Subject to any disclaimer, the term of this patent is extended or adjusted under 35 U.S.C. 154(b) by 281 days.

(21) Appl. No.: 12/290,112

(22) Filed: Oct. 27, 2008

(65) Prior Publication Data
US 2009/0127137 A1  May 21, 2009

Related U.S. Application Data

(63) Continuation-in-part of application No. PCT/EP2007/002794, filed on Mar. 29, 2007.

(30) Foreign Application Priority Data

Apr. 28, 2006 (DE) .......................... 10 2006 020 394

(51) Int. Cl.
*F17C 11/00* (2006.01)
(52) U.S. Cl. .............................. 95/116; 96/146; 206/0.7
(58) Field of Classification Search .............. 95/90, 116, 95/114, 115; 96/108, 146, 152, 154; 423/248, 423/648.1, 658.2; 206/0.7; 420/900
See application file for complete search history.

(56) References Cited

U.S. PATENT DOCUMENTS

| 4,609,038 | A | * | 9/1986 | Ishikawa et al. | 165/104.12 |
|---|---|---|---|---|---|
| 4,667,815 | A | * | 5/1987 | Halene | 206/0.7 |
| 5,987,895 | A | * | 11/1999 | Nishimura et al. | 62/46.2 |
| 6,267,229 | B1 | * | 7/2001 | Heung | 206/0.7 |
| 6,318,453 | B1 | * | 11/2001 | Ovshinsky et al. | 165/104.12 |
| 6,378,601 | B1 | | 4/2002 | Ovshinsky et al. | |
| 6,425,251 | B2 | * | 7/2002 | Stetson et al. | 62/46.2 |
| 6,432,176 | B1 | * | 8/2002 | Klos et al. | 96/117.5 |
| 6,432,379 | B1 | | 8/2002 | Heung | |
| 6,634,321 | B2 | * | 10/2003 | Hussain et al. | 123/3 |
| 6,638,348 | B2 | * | 10/2003 | Kuriiwa et al. | 96/146 |
| 6,991,770 | B2 | * | 1/2006 | Suzuki et al. | 422/198 |
| 6,993,888 | B2 | * | 2/2006 | Yang et al. | 53/447 |
| 7,320,726 | B2 | * | 1/2008 | Shih et al. | 96/154 |
| 7,323,043 | B2 | * | 1/2008 | Finamore | 96/146 |

FOREIGN PATENT DOCUMENTS

| DE | 3337754 | 5/1985 |
|---|---|---|
| DE | 4201131 | 7/1992 |
| DE | 69714233 | 10/1997 |

(Continued)

OTHER PUBLICATIONS

Machine generated English translation of EP 1454876 A1, published Sep. 2004.*

*Primary Examiner* — Frank M Lawrence
(74) *Attorney, Agent, or Firm* — Klaus J. Bach

(57) ABSTRACT

In a hydrogen reservoir having a housing with a hydrogen storage material arranged in the housing for absorbing and releasing hydrogen as needed, the hydrogen reservoir includes at least one unit having a porous body surrounding a container in which the hydrogen storage material is contained and a method is provided for charging the hydrogen reservoir with hydrogen from a hydrogen filling stations.

16 Claims, 2 Drawing Sheets

FOREIGN PATENT DOCUMENTS

| | | |
|---|---|---|
| DE | 10392248 | 5/2005 |
| EP | 0188996 | 7/1986 |
| EP | 1454875 | 9/2004 |
| EP | 1454876 A2 * | 9/2004 |
| JP | 60060399 | 4/1985 |
| JP | 2001208296 | 8/2001 |
| WO | 0181850 | 11/2001 |
| WO | 02/061249 | 8/2002 |

* cited by examiner

HYDROGEN RESERVOIR AND PROCESS FOR FILLING A HYDROGEN RESERVOIR

This is a Continuation-In-Part Application of pending International patent application PCT/EP2007/002794 filed Mar. 29, 2007 filed and claiming the priority of German patent application 10 2006 020 394.1 filed Apr. 28, 2006.

BACKGROUND OF THE INVENTION

The invention relates to a hydrogen reservoir and to a process for filling a hydrogen reservoir in which the hydrogen is absorbed and from which it can be released when desired.

It is known to store hydrogen by storing it either in gaseous form in pressure tanks at several hundred bar overpressure or in liquid form at cryogenic temperatures in special cooling tanks.

In addition, solid reservoirs are known, in which the hydrogen is absorbed, retained in the atomic structure thereof and released again when the temperature of the reservoir is increased. Since these hydrogen reservoirs require neither extreme temperatures nor high pressures, solid reservoirs are comparatively uncomplicated to handle. Such hydrogen reservoirs are therefore suitable for small-scale mobile applications, and also for use in motor vehicles. However, these storage materials can only absorb approximately 2% of their own weight in hydrogen at room temperature. This means that for example around 100 kg of the material is needed to store around 2 kg of hydrogen.

In addition, such hydrogen reservoirs require cooling during filling and heating during emptying, since hydrogen is generally released by an endothermic reaction on the part of the storage material.

Published patent application JP 60060399 discloses using hydrogen gas as a coolant for a solid reservoir of metal halides. Published patent application JP 2001208296 discloses a porous storage container which is likewise cooled using hydrogen as coolant. A hydrogen reservoir comprising a hydrogen-absorbing material is known from published patent application DE 10392240 T5, said hydrogen reservoir having a fiber-reinforced housing.

Patent DE 69714233 T2 discloses a solid hydrogen reservoir comprising an open-pore metal foam, which functions as a carrier matrix for a pulverulent, hydrogen-absorbing storage material. The pulverulent material is dispersed in the carrier matrix. To make entrainment of the finely dispersed material from the hydrogen reservoir more difficult, the carrier matrix is subdivided into segments, which are sealed off with partition walls which retain the storage material within the respective segments. Pipes in which a cooling medium or a heating medium may optionally be conveyed are passed through the carrier matrix, in order to cool the hydrogen reservoir during filling or to heat it during emptying.

U.S. Pat. No. 6,378,601 B1 discloses a process for filling a solid reservoir, in which hydrogen is used to cool the solid reservoir. The hydrogen flows through the solid reservoir by the flow-through method. Some of the hydrogen is absorbed by the storage material, while some of the hydrogen dissipates the heat generated in the process. The heated hydrogen is fed to a storage reservoir.

It is the object of the present invention to provide a solid reservoir for hydrogen which is as compact as possible, which has a variable layout and which is particularly suitable for use in a vehicle. It is also an object of the present invention to provide a process for filling such a hydrogen reservoir.

SUMMARY OF THE INVENTION

In a hydrogen reservoir having a housing with a hydrogen storage material arranged in the housing for absorbing and releasing hydrogen as needed, the hydrogen reservoir includes at least one unit having a porous body surrounding a container in which the hydrogen storage material is contained. Also a method is provided for charging the hydrogen reservoir with hydrogen from a hydrogen filling station.

The hydrogen reservoir according to the invention is in the form of a solid reservoir and comprises a housing, in which storage material is arranged, in which hydrogen may be purposefully stored and which may purposefully release hydrogen. Provided in the housing is at least one unit in which a porous body surrounds at least in places a container in which the storage material is contained in a locally concentrated form.

In this way, the porous body advantageously assumes multiple functions. On the one hand, it serves as a mechanical support for the container filled with storage material, while on the other hand it serves as a flow path for hydrogen from the storage material out of the housing and/or from a housing inlet to the storage material. In addition, it serves as a heat conductor, in order to cool the storage material during filling, if it is heated by exothermic ad- or absorption, or to heat it during emptying, in order to provide heat of reaction for endothermic desorption and to achieve purposeful release of hydrogen from the storage material. Any desired storage material may be used. The hydrogen reservoir may be filled within just a few minutes. The double enclosure of the storage material provides for an inexpensive and safe tank construction. A filling station infrastructure for filling hydrogen tanks may be simplified considerably over high pressure reservoirs operating at several hundred bar and conventional solid tanks. Under service conditions, coupling with a fuel cell system with evaporative cooling is particularly favorable.

Favorable storage materials which are suitable are in principle materials with an adsorptive or absorptive action, such as carbon structures, organometallic "framework" materials with intrinsic porosity, oxides, such as for instance titanium or silicon oxides. Preference is given to materials with chemical binding of the hydrogen, such as for instance modified complex hydrides, for example based on alanates, hydridoborates, also amide/hydride systems, magnesium and the alloys thereof, modified aluminum hydrides, aminoboranes, metal hydrides, for example modified AB2, AB5 alloys. Particular preference is given to materials displaying endothermic hydrogen release enthalpy in the range from 20-30 kJ/(mol $H_2$). Organic materials, such as carbon nanotubes or organic polymers, are also feasible. The storage materials may be used in the form of pellets, powder, granular product and the like. The storage material may, however, also undergo automatic pelletization, granulation and the like under operating conditions. Filling of the solid reservoir or the container and other handling of the storage materials to the point where the reservoir is ready preferably take place under inert gas or a hydrogen atmosphere, in order to avoid degradation of the storage materials on contact with air. In principle, the hydrogen reservoir may also be combined with a conventional pressure tank for hydrogen.

Because the container may be embedded in the preferably cup-shaped porous body, stable accommodation of the storage material is achieved. This makes it possible to reliably prevent the generally pulverulent storage material from being entrained out of the hydrogen reservoir. The storage material is safely encapsulated in the container and retained by the porous body. In comparison with known arrangements, in which pulverulent storage material is retained in a finely dispersed manner in a metal foam matrix or between aluminum lamellae, production is additionally simplified. The container is filled, closed and embedded in the porous body.

Mechanical forces due to expansion of the storage material, for instance due to storage of hydrogen, during charging with hydrogen may be absorbed by the container and/or by the porous body. The storage material may expand by up to 20% during hydrogen storage. The cup-shaped container is preferably closed by a lid with an interference fit. In this respect, the internal diameter of the lid is made to be somewhat smaller than the external diameter of the cup. The lid is heated and positioned on the colder cup in the expanded, heated state. During cooling the lid shrinks such that the lid is joined stably to the cup. Cup and lid are particle-tight when closed.

In at least one reservoir axis, a plurality of units may advantageously be arranged adjacent one another. The size of the reservoir may readily be changed at the design stage by stacking the units and/or arranging them side by side. The units may be positioned in a modular manner adjacent one another widthwise and/or heightwise. The modular construction with the preferred units facilitates the manufacture of hydrogen reservoirs in accordance with different objectives.

Advantageously, the units may be arranged in such a way that a lid of the container of the one unit supports the base of the porous body of the next unit in the stack direction. A staggered arrangement is also possible, in order to improve flow control. In this way, the container is in all-round contact with the porous body and is held secure thereby while also being held in intimate thermal contact with the heat-conducting porous body. The housing is preferably completely filled with such units and is therefore very robust with respect to vibrations or exposure to impacts. Furthermore, degradation, caused by thermal overheating of catalysts associated with the storage medium, preferably titanium-based catalysts in storage materials based on alanate and/or on amide/hydride and/or on hydridoborates, may be avoided.

Preferably, the porous body forms a principal flow path for the hydrogen between an inlet and an outlet of the housing. In the simplest case, it is possible to dispense with the provision of separate hydrogen lines in the housing.

More favorably, the porous body comprises a metal foam, preferably of aluminum. Preferably, the container is made of gas-permeable sintered metal. The container may also be made of gas-permeable plastics. This is conveniently sufficiently porous to enable adequate hydrogen transfer and at the same time is sufficiently dense to retain the pulverulent storage material.

To improve utilization of the empty volume in the porous body and to speed up reaction kinetics, the pressure may be selected to be high during filling, for example 50 bar or more, in accordance with the selected wall thickness of the housing of the hydrogen reservoir. Hydrogen gas may be stored under pressure in the porous body, in addition to the hydrogen in the storage material.

In a favorable configuration, a temperature control agent line may be arranged inside the housing, which line may be designed in particular for connection with a vehicle cooling system. In this way, purposeful temperature control may be improved during filling and/or emptying of the hydrogen reservoir.

Conveniently, means for evenly dispersing and/or collecting hydrogen may be arranged in the housing at the inlet and/or the outlet end.

The housing is preferably made of metal, for example stainless steel. Alternatively, the housing may be made of a carbon fiber material. Through this configuration, a light and optionally freely shapeable reservoir structure may be achieved. This is particularly favorable in the event of use in the vehicle sector, where it is desirable to make the best possible use of the available installation space and the hydrogen reservoir may be conformed to the available installation space. In addition, an inner casing (liner) of the solid reservoir may be provided as a diffusion barrier and be made of metal, for instance of stainless steel or aluminum, or of plastics and wrapped in carbon fiber material for the purpose of mechanical stabilization.

The hydrogen reservoir according to the invention is particularly advantageously suitable for rapid filling or charging by a hydrogen stream which is conducted through the housing entering at the inlet end and acting simultaneously as a hydrogen source and as a coolant. This works very favorably in the case of a hydrogen reservoir, the storage material of which is embedded in a locally concentrated manner in a porous body. The porous body constitutes the flow path for the hydrogen into and out of the hydrogen reservoir. Filling of the hydrogen reservoir may proceed very rapidly and is preferably carried out using the flow-through method. Compared with known filling processes, in which hydrogen flows into the reservoir but does not flow out again, and in which filling takes a long time and heat transfer is critical, filling time is reduced significantly. Due to improved heat management in the case of filling, the duration of the filling process may be reduced to such an extent as is particularly desirable with regard to use in the automotive sector, in which a filling time which may take hours is not acceptable.

The hydrogen stream is cooled, before being fed to the hydrogen reservoir, to a temperature which is sufficient to absorb the waste heat produced during filling and to leave the hydrogen reservoir at a temperature below a predetermined threshold. If the hydrogen reservoir has a storage capacity of 4 kg of hydrogen, for example, around 40-60 MJ of heat of reaction have to be transferred in order to fill said reservoir. This may be achieved by means of a very high mass flow rate of the introduced hydrogen, which is unfavorable with regard to energy, since the elevated volumetric flow rate leads to a very high drop in pressure. More advantageous is the use of a large temperature differential, i.e. the use of precooled hydrogen.

Conventionally, hydrogen filling stations have precooled or even liquid hydrogen at their disposal, such that no additional expense is required for cooling. The filling infrastructure may be simplified, since supply of a separate coolant, for instance cooling water for cooling the hydrogen reservoir, may be dispensed with. Associated equipment, such as pumps, lines and the like, is accordingly also dispensed with. Preferably, the hydrogen stream is supplied at a pressure of at least 30 bar, preferably 50 bar, or even up to 350 bar. Since the hydrogen reservoir according to the invention operates overall at a relatively low pressure, the hydrogen may optionally be taken without any special compressor stages directly from an electrolyzer, a reformer, a solid hydrogen reservoir or a gas pipeline. Where an overflow installation is present, this may be operated with a corresponding pressure reducing valve.

Advantageously, the hydrogen stream may flow through the porous body, fill the locally concentrated storage material and at the same time flow around the storage material in a manner which dissipates heat. A large quantity of hydrogen flows in this way around the particles of storage material, with only a small proportion of this hydrogen reacting and being absorbed. The unreacted portion of the hydrogen absorbs the heat of reaction and transfers this out of the system. The warmed-up hydrogen may then be cooled down externally outside the hydrogen reservoir. It is therefore possible, with regard to filling the reservoir, to dispense with laborious, time-consuming connection of cooling lines to the hydrogen reservoir. The hydrogen supply, from which the hydrogen reservoir is filled, is preferably a tank of compressed hydrogen gas (cH2—compressed $H_2$).

The warmed-up hydrogen stream is cooled back down externally once it has left the hydrogen reservoir. This may proceed in a centralized manner at the hydrogen filling station.

The invention will become more readily apparent from the following description of a preferred exemplary embodiment thereof on the basis of the accompanying drawings.

BRIEF DESCRIPTION OF A PREFERRED EMBODIMENT

In the figures, elements which have the same function are labeled with the same reference signs.

Figure 1A:
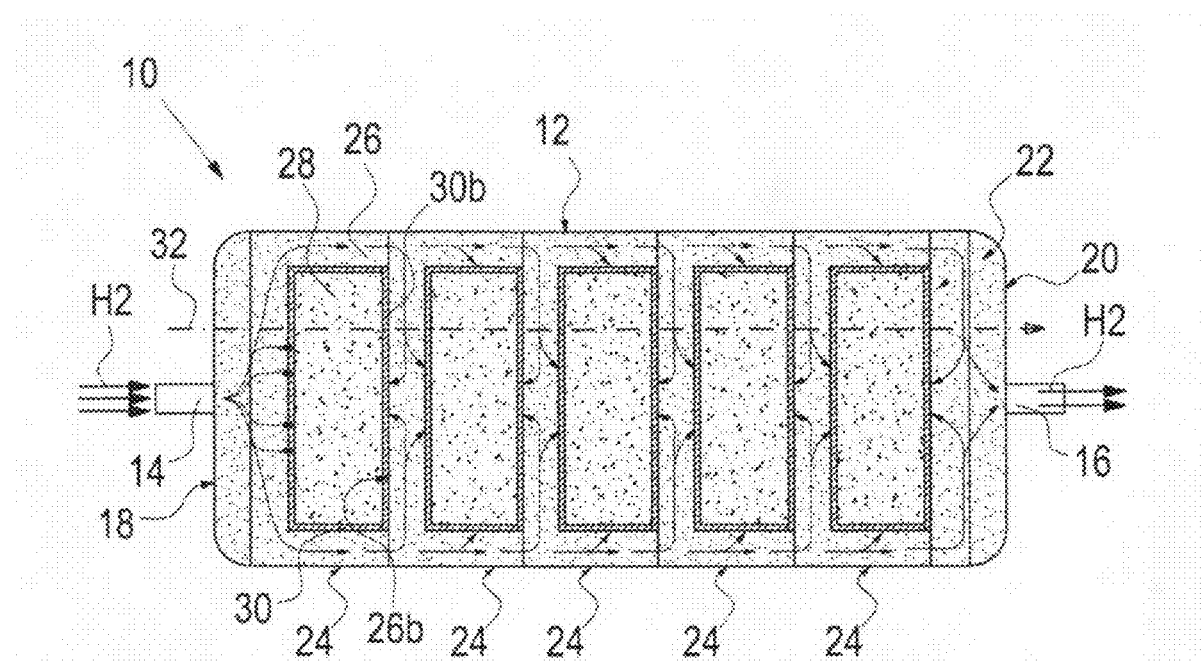
FIGS. 1A and 1B show a section through a hydrogen reservoir (1A) according to the invention and an alternative configuration of a hydrogen reservoir with more storage volume (1B)
Figure 1B:
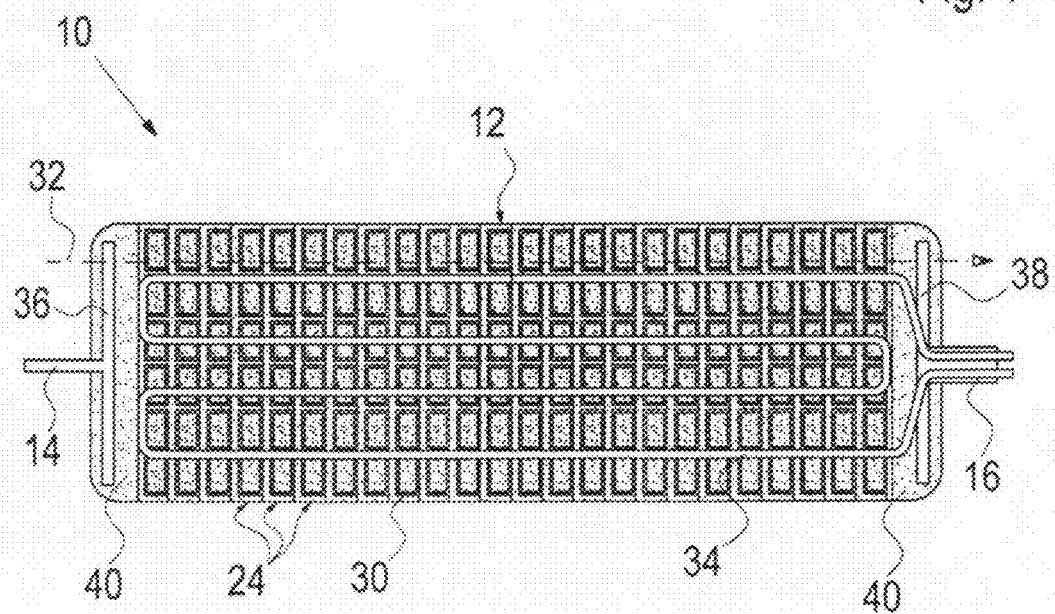

Two configurations of a hydrogen reservoir 10 according to the invention are shown in FIGS. 1A and 1B. The hydrogen reservoir 10 is configured as a type of storage pipe.

The hydrogen reservoir 10 comprises a housing 12, in which a plurality of units 24 are arranged adjacent one another in a row along a reservoir axis 32, filling the housing 12 between an inlet 14 at one end 18 and an outlet 16 at another end 20 of the housing 12. The reservoir axis 32 corresponds to the stack direction of the units 24.

Figure 2:
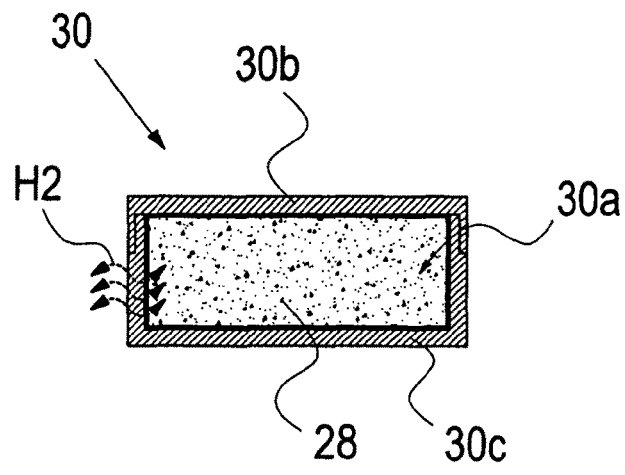
FIGS. 2A and 2B show a preferred container with storage material (2A) and a preferred porous body for accommodating the container (2B)
Figure 2B:
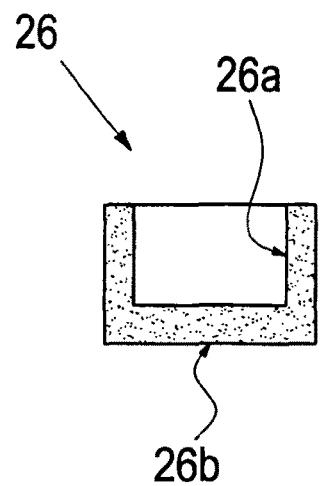

As is additionally explained in greater detail in FIGS. 2A and 2B, each unit 24 consists of a cup-shaped porous body 26 with a recess 26a and a preferably closed base 26b. A container 30 comprising a cup-shaped body 30c closable with a lid 30b and preferably made from gas-permeable sintered metal is inserted into the recess 26a. The lid 30b may be adhesively bonded, soldered or welded to the cup-shaped body 30c or joined thereto by an interference fit. The wall thickness of the container 30 is conveniently as small as possible. The preferred material is a sintered stainless steel, the greatest possible elasticity and good thermal conductivity being advantageous.

In the interior 30a of the container 30 there is arranged a storage material 28, for example a pulverulent metal hydride or the like, preferably in press-compacted form. Hydrogen may be stored in the storage material 28 and may be purposefully absorbed and released by the action of heat. The container 30 preferably retains particles of pulverulent storage material 28 with a grain size >0.5 μm and allows gas and heat to pass in both directions, as indicated by discontinuous double-headed arrows.

The porous body 26 is preferably made of aluminum foam with a porosity of preferably between 5 and 90 ppi (pores per inch). The porous body 26 or all the porous bodies 26 in the units 24 provide support for the containers 30 thereof and thus the storage material 28, transfer waste heat to the outside or cool the storage material 28 and serve outside the container 30 as a flow path for the hydrogen within the housing 12. Advantageously, therefore, no separate lines are needed for the hydrogen in the interior 22 of the hydrogen reservoir 10. The porous body 26 forms a principal flow path for the hydrogen between the inlet 14 and the outlet 16 of the housing 12. Numerous small arrows in FIG. 1A indicate the inflowing or through-flowing hydrogen within the housing 12.

The units 24 are arranged in such a way that, in each case, a lid 30b of the container 30 of the one unit 24 abuts against a base 26b of the porous body 26 of the next unit 24 in the direction of the reservoir axis 32. The units 24 may also be staggered relative to one another. Depending on the reservoir layout, units 24 may also be arranged next to one another perpendicularly to the reservoir axis 32.

FIG. 1B shows such a configuration with a plurality of units 24 which are arranged both in the direction of the reservoir axis 32 and perpendicularly thereto.

In order, for example, to store 4 kg of hydrogen in a storage material which can absorb approximately 2% of its weight in hydrogen, approximately 200 kg of storage material 28 needs to be distributed over an appropriate number of containers 30. Due to the modular structure, an appropriate number of units 24 may be suitably assembled as per the design until the desired storage volume is obtained.

Depending on the design of the hydrogen reservoir 10 taking the form of a storage pipe, a temperature control agent line 34, for instance for a coolant and/or a heating agent, may be arranged in the interior 22 of the housing 12, with which line hydrogen absorption or hydrogen release may be purposefully controlled during filling and emptying (FIG. 1B), so obtaining the most uniform possible utilization of the hydrogen reservoir 10 precisely with large storage volumes. The temperature control agent line 34 may be capable of being connected to a fuel cell system and/or to a filling station.

Likewise, means 36, 38 for even distribution of and/or for collecting hydrogen may be arranged in the housing 12 at the inlet end and/or at the outlet end, so as to achieve maximally uniform flow through the units 24 and thus efficient and homogeneous temperature control. To this end it is convenient for these means 36 and 38 to be embedded in a porous material 40 corresponding to the porous body 26, in order to achieve a good flow distribution and temperature distribution. Such hydrogen reservoirs 10, illustrated in FIGS. 1a and 1b and taking the form of storage pipes, may advantageously be assembled into large volume reservoirs by combining a plurality of hydrogen reservoirs 10 inside a reservoir housing and conveniently interconnecting the storage pipes with regard to flow and optionally with regard to possible temperature control agent lines 34.

Figure 3:
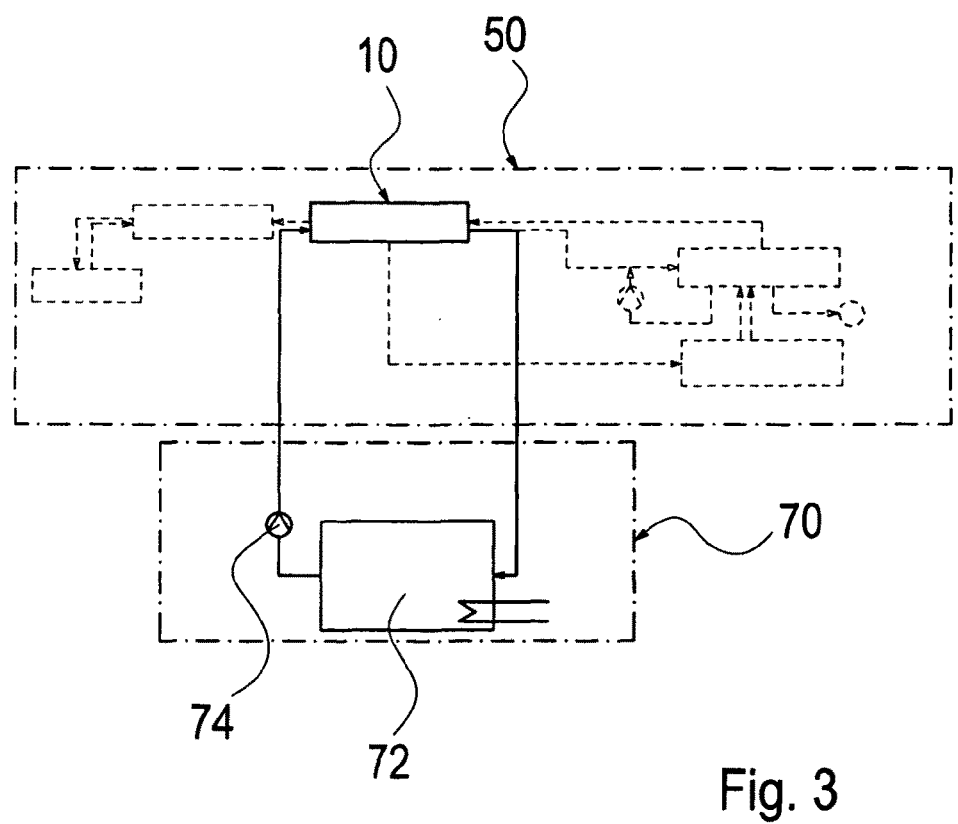
FIG. 3 is a filling diagram of a preferred hydrogen reservoir.

FIG. 3 is a schematic representation of a detail of a preferred fuel cell system 50, as it may be used in a vehicle which contains a preferred hydrogen reservoir 10 and which is filled with hydrogen at a filling station 70. The function and structure of such a fuel cell system 50 are generally known, such that it is unnecessary to give a more detailed explanation at this point.

The hydrogen reservoir 10 is connected to a storage tank 72 via a hydrogen line belonging to the filling station. Typically, the storage tank 72 is filled with precooled, compressed hydrogen cH2 at for example 50 bar or more. This is transported with the assistance of a conveying means 74 to the hydrogen reservoir 10, a jet pump and/or a blower constituting advantageous conveying means 74.

The pre-cooled hydrogen enters the inlet 14 of the hydrogen reservoir 10 at a low temperature and there flows through the units 24 comprising the porous bodies 26 and containers 30 with storage material 28 (FIGS. 1a, 1b). The inlet temperature of the hydrogen is preferably conformed to the storage material used. During charging of the storage material 28 heat of reaction is released and transported away by the cold hydrogen gas directly from the storage material 28 into the porous body 26, which conducts heat well. The hydrogen gas which has been warmed-up by the adsorption of hydrogen is conducted out of the outlet of the hydrogen reservoir 16 is preferably cooled before it is returned back into the storage tank 72.

Filling of the hydrogen reservoir 10 proceeds by the flow-through method, wherein the hydrogen stream fed into the housing 12 at the inlet end serves simultaneously as a hydrogen source and as a coolant. The hydrogen discharged at the outlet end is cooled down again outside the hydrogen reservoir 10.

The conveying means 74 preferably takes the form of a recirculation blower or of a jet pump and preferably operates at a delivery pressure of 50 bar or more. In the case of a jet pump the quantity there injected advantageously corresponds exactly to the quantity of hydrogen consumed by the exothermic absorption, such that a constant quantity is circulated.

What is claimed is:

1. A hydrogen reservoir having a housing (12), with hydrogen storage material (28) arranged in the housing (12) for absorbing and releasing hydrogen as needed, the hydrogen reservoir (10) including at least one unit (24) having a porous bodies (26) and, disposed in the porous bodies, containers (30) in which the hydrogen storage material (28) is contained, the porous bodies (26) with the containers (30) disposed therein being arranged in the housing (12), with the porous bodies (26) together forming in the housing (12) hydrogen supply and discharge passages.

2. The hydrogen reservoir as claimed in claim 1, wherein the porous bodies (26) are cup-shaped and the containers (30) are embedded in the cup-shaped porous bodies (26).

3. The hydrogen reservoir as claimed in claim 1, wherein a plurality of units (24) are arranged in mutually adjacent manner along at least one reservoir axis (32).

4. The hydrogen reservoir as claimed in claim 3, wherein each container (30) has a lid (30b) and the units (24) are stacked in such a way that the lid (30b) of the container (30) of the one unit (24) abuts a base (26b) of the porous body (26) of the next unit (24) in the stack direction (32).

5. The hydrogen reservoir as claimed in claim 1, wherein the porous bodies (26) form a principal flow path for the hydrogen between an inlet (14) and an outlet (16) of the housing (12).

6. The hydrogen reservoir as claimed in claim 1, wherein the porous bodies (26) comprise a metal foam.

7. The hydrogen reservoir as claimed in claim 1, wherein the container (30) consists of a gas-permeable sintered metal.

8. The hydrogen reservoir as claimed in claim 1, wherein the containers (30) consist of gas-permeable plastics.

9. The hydrogen reservoir as claimed in claim 1, wherein a temperature control agent line (34) is arranged in the interior (22) of the housing (12), for connection to a vehicle cooling system.

10. The hydrogen reservoir as claimed in claim 1, wherein means (36, 38) for evenly distributing hydrogen and for collecting hydrogen are arranged in the housing (12) at least one of the inlet end and the outlet end.

11. The hydrogen reservoir as claimed in claim 1, wherein the housing (12) consists of metal.

12. The hydrogen reservoir as claimed in claim 1, wherein the housing (12) comprises a carbon fiber material.

13. The hydrogen reservoir as claimed in claim 1, wherein the housing (12) is wrapped in carbon fiber material.

14. A process for filling a hydrogen reservoir (10), comprising a housing (12), with hydrogen storage material (28) arranged in the housing (12) for absorbing and releasing hydrogen as needed, the hydrogen reservoir (10) including at least one unit (24) having porous bodies (26) surrounding containers (30) in which the hydrogen storage material (28) is contained, the porous bodies (26) with the containers (30) disposed therein being arranged in the housing (12) with the porous bodies (26) together forming hydrogen supply and discharge passages in the housing (12), said process comprising the steps of supplying a hydrogen stream into the housing (12) at an inlet end thereof, which stream serves simultaneously as a hydrogen source and as a coolant for the storage material (28), cooling the hydrogen stream before it enters the hydrogen reservoir (10), to a temperature which is sufficient to absorb any heat formed during filling, so as to maintain the hydrogen reservoir (10) at a temperature below a predetermined threshold.

15. The process as claimed in claim 14, wherein the hydrogen is fed to the hydrogen reservoir (10) in a flow-through method.

16. The process as claimed in claim 15, wherein the hydrogen stream is cooled down externally after leaving the hydrogen reservoir (10).

* * * * *